United States Patent
Emmerich et al.

(10) Patent No.: US 8,082,354 B2
(45) Date of Patent: Dec. 20, 2011

(54) METHOD OF NOTIFYING A COMMUNICATIONS DEVICE

(75) Inventors: Mark Emmerich, San Jose, CA (US); Karamadai Srinivasan, Foster City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 12/414,826

(22) Filed: Mar. 31, 2009

(65) Prior Publication Data

US 2010/0250760 A1 Sep. 30, 2010

(51) Int. Cl.
*G06F 15/16* (2006.01)

(52) U.S. Cl. ......... 709/230; 709/217; 455/411; 455/419

(58) Field of Classification Search .................. 709/217, 709/230; 455/411, 419
See application file for complete search history.

(56) References Cited

U.S. PATENT DOCUMENTS

| 5,631,853 | A | * | 5/1997 | Miller et al. | 702/176 |
| 6,243,662 | B1 | * | 6/2001 | Hashimoto | 702/187 |
| 2005/0243058 | A1 | * | 11/2005 | Morris et al. | 345/158 |
| 2010/0210240 | A1 | * | 8/2010 | Mahaffey et al. | 455/411 |

OTHER PUBLICATIONS

U.S. Appl. No. 12/251,302, filed Oct. 14, 2008, "HTTP Push to Simulate Server-Initiated Sessions"; first named inventor: Mamoun Abu-Samaha.

* cited by examiner

*Primary Examiner* — Kyung H Shin

(57) ABSTRACT

In one aspect of the disclosure, a method of notifying a communications device in a network includes sending an http push request from a communications device through a network to a computing device, wherein the http push request having a first lifespan. The method also includes receiving a timeout error from the network and sending a second http push request from the communications device through the network to the computing device. The second http push request is of a second lifespan, which is less than the first lifespan.

16 Claims, 3 Drawing Sheets

METHOD OF NOTIFYING A COMMUNICATIONS DEVICE

BACKGROUND OF THE INVENTION

In a portable communications device, such as a cellular telephone, personal digital assistant, or other handheld communications device capable of receiving and transmitting information, a premium is placed on minimizing the size and weight of the device. For many portable communications devices, the size of the battery that powers the device can represent a significant portion of the device's size and weight. Thus, designers of portable communications devices are often required to make trades between performance and the size and weight of the device. At one end, a large, bulky battery, while ensuring that the device can operate for extended periods of time without recharging, can require the device to be bulky and aesthetically unpleasing. At the other end, a battery that is too small, while enabling the device to be lightweight and stylish, may require frequent recharging in order to maintain the device's operation.

DESCRIPTION OF THE EMBODIMENTS

Figure 1:
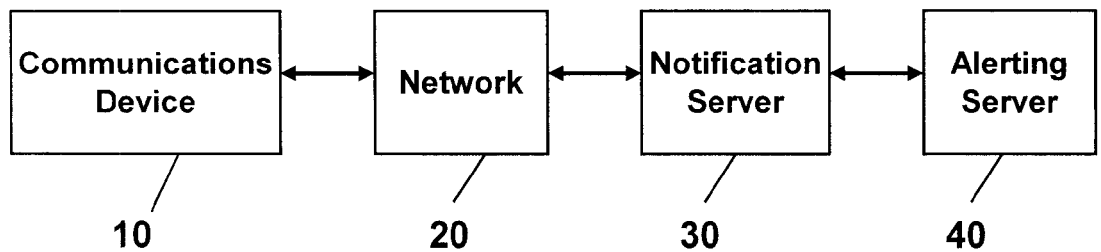
FIG. 1 is a block diagram showing the environment in which a communications device may operate in accordance with an embodiment of the invention.

FIG. 1 is a block diagram showing the environment in which a communications device may operate in accordance with an embodiment of the invention. In FIG. 1, communications device 10, which could be a cellular telephone, personal digital assistant, or any other portable communications device capable of receiving and transmitting information, couples to network 20 in order to convey information to and from the device. Network 20 represents a cellular communications network, WiFi network, or any other communications network capable of conveying signals between notification server 30 and communications device 10. In the embodiment of FIG. 1, alerting server 40 conveys data to communications device 10 by way of notification server 30 and network 20.

In one exemplary embodiment, communications device 10 of FIG. 1 generates an http push request of a first lifespan. The request is sent by way of network 20 and received at notification server 30. Notification server 30 is contemplated as being any type of computing device that can interface with al telecommunications network (such as network 20) to receive and transmit information between the network and an alerting server. When notification server 30 receives the http push request from network 20, the server 30 places the request in a queue and associates the request with a unique identification string that corresponds to communications device 10. In one example, the http push request originated by communications device 10 is a request for a stock quote or other time-sensitive information. The request and the identification corresponding to communications device 10 are placed in a "pending" request queue within notification server 30. When alerting server 40 transmits information satisfying the request to notification server 30, the server returns the request to communications device 10 along with an appropriate response to the request, such as an updated stock quote, updated sports information, and so forth.

In the embodiment of FIG. 1, a characteristic of network 20 is the length of time that an http push request can exist within the network. The inventors of the claimed invention have determined that some cellular and WiFi networks allow unserviced http push requests to exist within the network for various maximum time periods. These time periods may range from 5 minutes up to as much as 30 minutes. However, in other embodiments of the invention, networks allowing unserviced requests to exist within the network for less than 5 minutes or greater than 30 minutes can be represented by network 20.

In an exemplary embodiment, network 20 may allow an unserviced request to exist within the network for 10 minutes without causing the network to issue a "timeout" error to the communications device. Communications device 10 may issue an http push request having a 5-minute lifespan in an attempt to obtain data from alerting server 40 by way of notification server 30 and network 20. However, each time communications device 10 transmits an http push request, the transmitter (such as transmitter 125 of FIG. 2) of the communications device may require a substantial amount of current from its battery (such as battery 160 of FIG. 2). A more optimal solution may be for the communications device to issue an http push request perhaps every 9 or 10 minutes. By increasing the length of time between push requests to more closely align with the maximum amount of time that an unserviced request can exist within network 20, communications device 10 can require less current from its battery while still being able to quickly receive responses from notification server 30 without incurring timeout errors from the network.

In the event that communications device 10 is receiving responses from notification server 30 without incurring timeout errors from network 20, such as for a notification of an event, no adjustment in the length of time between push requests need be made. In the event that neither notifications nor timeout errors are being received, the device may increase the lifespan of one or more subsequent http push requests by an incremental amount. In one exemplary embodiment, this incremental amount could be 1 minute. However, in other embodiments of the invention, the increment could be less than 1 minute, such as 30 seconds, or by more than one minute (such as 2, 3, 4, or more minutes). In the event that an http push request having a lifespan greater than the sum of an initial time period plus the incremental amount does not result in a timeout error from network 20, communications device 10 may issue the next http push request with a greater lifespan. This process of issuing an http push request, not receiving a timeout error from the network, and then transmitting a subsequent http push request having an incrementally greater lifespan can continue until the timeout limit of network 20 is reached. When this upper timeout limit has been reached, communications device 10 may issue subsequent http push requests that approach, but do not exceed, the upper timeout limit for network 20.

In the embodiment of FIG. 1, it is possible that communications device 10 may enter a network 20 having a greater upper timeout limit while the device is in use, such as when switching cells in a cellular network or when transitioning from Wi-Fi to GPRS (General Packet Radio Service) cellular communications. To provide for this possibility, communications device 10 occasionally attempts to issue an http push request having an incrementally larger lifespan in order to determine whether such a situation has occurred. If the http push request having the larger lifespan does not result in the device receiving a timeout error from the network, the communications device may issue the next http push request having an even greater lifespan. Thus, through occasionally attempting to increase the lifespan of the http push requests, the communications device advantageously adjusts to the greater timeout limit.

In another example, when moving to a different network having a lower timeout, such as from 10 minutes to 4 minutes, when communications device 10 polls the network and receives a timeout error, the device may issue a subsequent request using a 5-minute lifespan. When the communications device receives a second timeout error from the network, the device may transmit another http push request having a lifespan of 2 minutes. When the communications device does not receive a timeout error from network 20, the device may transmit yet another http push request having a 3-minute lifespan. In this manner, when moving between cellular coverage zones or between a cellular coverage zone and a WiFi coverage zone (for example), communications device 10 adjusts the period in between subsequent http push requests so as to maximize the inter-request period without receiving a timeout error from network 20.

Figure 2:
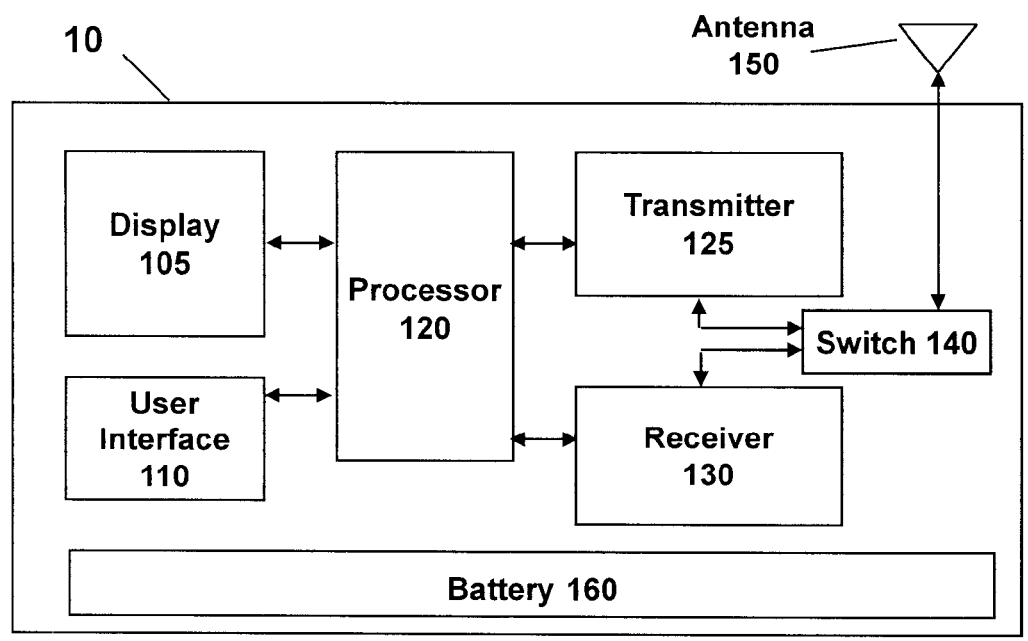
FIG. 2 is a block diagram showing an exemplary communications device operating in accordance with an embodiment of the invention.

FIG. 2 is a block diagram showing an exemplary communications device operating in accordance with an embodiment of the invention. Communications device 10 of FIG. 2 includes display 105 and user interface 110. Both display 105 and user interface 110 are coupled by way of an appropriate inter-device bus structure to processor 120. In the embodiment of FIG. 2, processor 120 executes a method that periodically or intermittently adjusts the period of time in between subsequent http push requests transmitted from the device. When timeout errors are received from the network (such as network 20 of FIG. 1) processor 120 decrements the time period between requests. When timeout errors have not been received from the network, processor 120 may increment the time period in between http push requests.

In the embodiment of FIG. 2, processor 120 may also collect statistical information pertaining to the number of timeout errors received from network 20. Additionally, processor 120 may calculate an average lifespan of an http push request that resulted in receiving a timeout error from the network as well as the value of the most-recently transmitted lifespan of the http push request that resulted in receiving a timeout error from the network. The processor may also count the number of times in a row that a particular lifespan of an http push request has resulted in receiving a timeout error as well as the total number of http push requests that has resulted in receiving a timeout error from the network.

Processor 120 is also coupled to transmitter 125 and receiver 130. These components are coupled to antenna 150 by way of switch 140. Although not specifically illustrated in FIG. 2, battery 160 may provide power to some or all of the components shown in the Figure. Further, although antenna 150 is shown as being an external to communications device 10, many embodiments of the present invention may feature antenna 150 being within the housing of the communications device.

Figure 3:
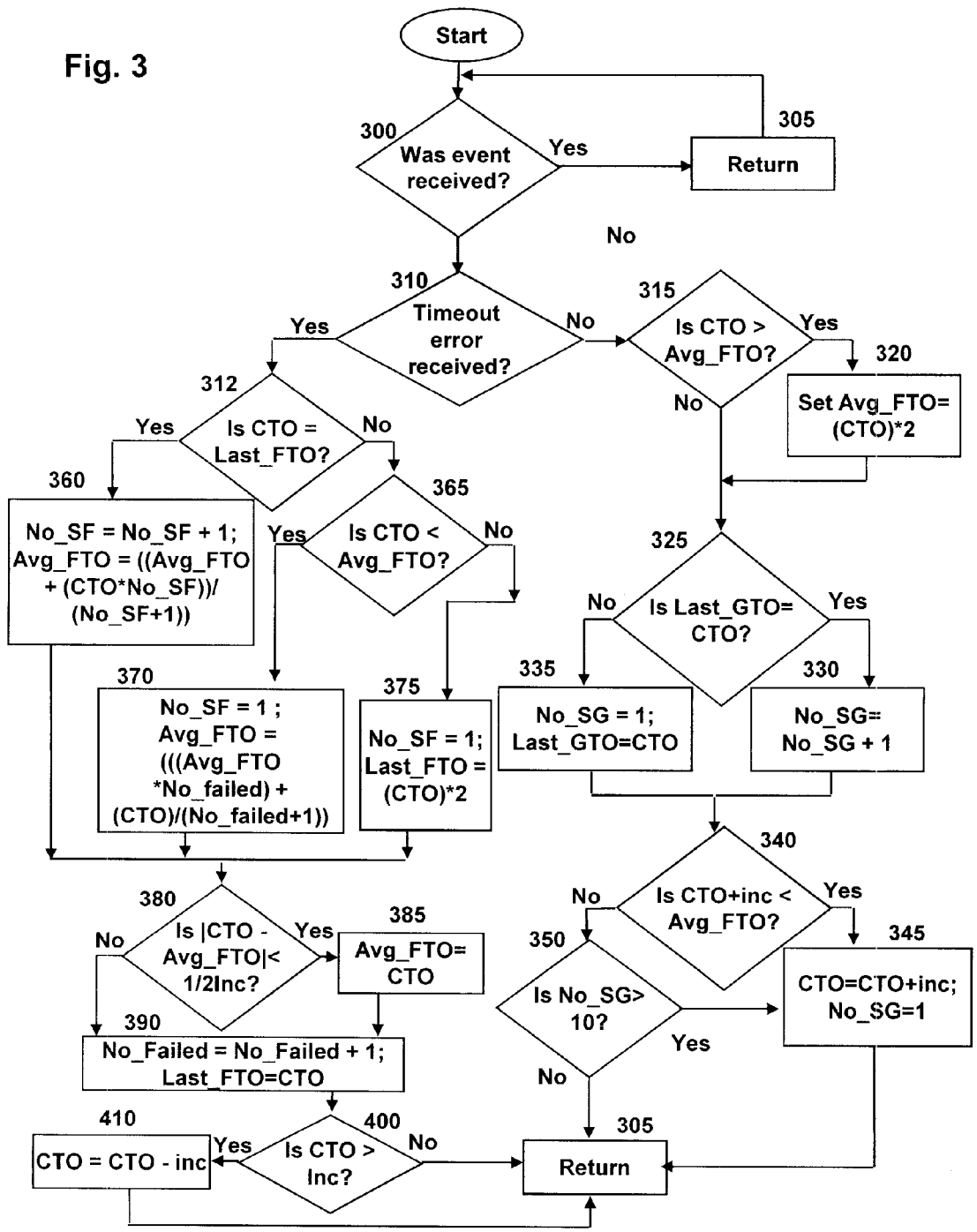
FIG. 3 is a flowchart for a method of operating a communications device in accordance with an embodiment of the invention.

FIG. 3 is a flowchart for a method of operating a communications device in accordance with an embodiment of the invention. Although the method of FIG. 3 may be performed using processor 120 of communications device 10, nothing prevents the operation of the method using devices having various alternative configurations. Among other things, the purpose of the embodiment of FIG. 3 is to adjust the lifespan of http push requests to a maximum value without receiving timeout errors from the network. In FIG. 3, the use of the variable Current Timeout (CTO) is adjusted to become less than or equal to the maximum lifespan that an http push request can exist within the network without receiving a timeout error.

The method of FIG. 3 begins at step 300. In step 300, the communications device determines if an event has been received. In the context of FIG. 3, this is an event in which the device has received an appropriate response to a previously-transmitted http push request. This may have been a request for an updated stock quote, news and information, sports scores, or any other time-sensitive information. If indeed an event has been received, step 305 is executed in which control returns to the beginning of the method while maintaining the Current Timeout (CTO).

In the event that the result of step 300 indicates that an event has not been received, step 310 is executed. In step 310, a determination is made as to whether the last http push request from the communications device has resulted in a timeout error from the communications network. In the event that a timeout error has not been received, step 315 is executed. In step 315, a determination is made as to whether the Current Timeout (CTO) is greater than an average of lifespan of those http push requests that resulted in a timeout error being received from the network (Avg_FTO or Average Failed Timeout). In the event that the Current: Timeout (CTO) is indeed greater than the Average Failed Timeout (Avg_FTO), step 320 is executed.

In step 320, the Average Failed Timeout is set equal to twice the value of the Current Timeout. Performing step 320 can be especially useful when the communications device moves from a network having a relatively low value for an upper timeout limit to a network having a much higher timeout limit, such as moving from a network having a 5-minute upper timeout limit to a network having a 30-minute upper timeout limit. In this instance, the new value Average Failed Timeout (Avg_FTO) might be doubled from 5 minutes to 10 minutes. After performing step 320, the method continues at step 325.

Returning to step 315, if the outcome of this step indicates that the Current Timeout (CTO) is not greater than the Average Failed Timeout (Avg_FTO), step 325 is executed. In step 325, a decision is made as to whether the value of the Last Good Timeout (Last_GTO, which represents the value that Current Timeout [CTO] was set to the last time a timeout error from the network was not received) is equal to the Current Timeout (CTO). If these two values are indeed equal, step 330 is executed in which the Number of Same Good (No_SG) is incremented by 1. In the embodiment of FIG. 3, the Number of Same Good (No_SG) provides the number of consecutive times that a particular value of the Current Timeout (CTO) has not resulted in the receipt of a timeout error from the network.

If the decision of step 325 indicates that the value of the Last Good Timeout (Last_GTO) is not equal to the Current Timeout (CTO), step 335 is executed in which the Number of Same Good (No_SG) is set equal to 1. Additionally in step 335, the value of the Last Good Timeout (Last_GTO ) is set equal to the value of the Current Timeout (CTO). In the embodiment of FIG. 3, the Last Good Timeout (Last_GTO ) represents the value to which the Current Timeout (CTO) was set the last time a network error was not received. The method continues at step 340.

At step 340, a decision is made as to whether the Current Timeout (CTO) plus an incremental amount (such as 1 minute) is less than the Average Failed Timeout. In the event that the Current Timeout (CTO) plus the incremental amount is indeed less than the Average Failed Timeout (Avg_FTO), step 345 is executed in which the Current Timeout (CTO) is increased by the incremental amount. Also in step 345, the Number of Same Good (No_SG) is set equal to 1. If, however, the decision of step 340 indicates that the Current Timeout (CTO) plus the incremental amount is not less than the Average Failed Timeout (Avg_FTO), step 350 is executed in which a determination is made as to whether the Number of Same Good (No_SG, which represents the number of consecutive times that a particular value of the Current Timeout that has not resulted in the receipt of a timeout error from the network) is greater than 10. In the event that the Number of Same Good (No_SG) is indeed greater than 10, step 345 is performed.

In some embodiments of the invention, performing steps 345 and 350 allows the communications device to periodically test the upper threshold of the particular network with which the communications device is coupled. Thus, in the event that upper timeout limit of the network increases (perhaps due to the communications device relocating to a network having different characteristics) the device can adapt its inter-request period to optimize its operation within the new network. In the event that the Number of Same Good (No_SG) is not greater than 10, step 305 is performed in which the previous value for the Current Timeout (CTO) is not incremented and the method returns to the beginning.

Returning now to step 310, in the event that the communications device has received a timeout error from the network, step 312 is executed in which a determination is made as to whether the value for the Current Timeout (CTO) is equal to the value for the Last Failed Timeout (Last_FTO). In the event that the Current Timeout (CTO) is indeed equal to the Last Failed Timeout (Last_FTO), step 360 is performed in which the Number of Same Failed (No_SF), which corresponds to the number of times communications device has consecutively received a timeout error at a given value of the Current Timeout, is incremented.

Also performed at step 360 is the following calculation:

$$\text{Avg\_FTO} = \frac{\text{Avg\_FTO} + (CTO * \text{No\_SF})}{\text{No\_SF} + 1}$$

In the above formula, more weight is given to the Current Timeout (CTO) when the Number of Same Failed (No_SF) increases. This causes the value of the Average Failed Timeout (Avg_FTO) to quickly converge as the Number of Same Failed (No_SF) increases. Thus, the algorithm above is referred to as a "quick convergence algorithm". In the context of the present invention, a quick convergence algorithm may be defined as any algorithm that converges more rapidly than a running average algorithm. The algorithm shown above additionally possesses the desirable feature of being "arithmetically light" meaning that the algorithm is considered not to be computationally intensive. However, other embodiments of the invention may employ different quick convergence algorithms that may be more computationally intensive according to the system constraints of the particular application.

In an example that illustrates the rapid convergence of the above formula, consider the Average Failed Timeout (Avg_FTO) as being equal to 80. Further, consider that the Current Timeout (CTO) is measured at 40 for three consecutive occurrences. With these values, the value of the Average Failed Timeout (Avg_FTO) would converge from an initial value of 80, to 60, to 47, and then to 42. If a simple running average were to be used, the value for the Average Failed Timeout (Avg_FTO) would converge to 40 more slowly, beginning with an initial value of 80, followed by 60, followed by 53, and then to 50, and so forth.

Returning now to the method of FIG. 3, in the event that the decision of step 312 indicates that the Current Timeout (CTO) is not equal to the value of the Last Failed Timeout (Last_FTO), step 365 is performed. In step 365, a determination is made as to whether the value for the Current Timeout (CTO) is less than the Average Failed Timeout (Avg_FTO). In the event that Current Timeout (CTO) is less than the Average Failed Timeout (Avg_FTO), step 370 is executed in which the Number of Same Failed (No_SF, which corresponds to the number of times the communications device has consecutively received a timeout error at a given value of Current Timeout) is set equal to 1.

Additionally, the following calculation is performed at step 370:

$$\text{Avg\_FTO} = \frac{(\text{Avg\_FTO} * \text{No\_failed}) + CTO}{(\text{No\_failed} + 1)}$$

In the above-identified calculation performs a running average of the Average Failed Timeout (Avg_FTO). The formula represents a concise way of maintaining the running average of a sequence without requiring the continuous tracking of each number in the sequence. In an example to illustrate the merits of the above formula, consider a sequence of numbers consisting of: 80, 60, 70, 90, 100, and 70. Of course, the first time the running average is calculated, the result is 80. The second time the average is calculated, ((80×1)+60)/(1+1)=70. The third time the average is calculated, ((70×2)+70)/(2+1)= 70. The fourth time the average is calculated, ((70×3)+90)/(3+1)=75. The fifth time the average is calculated, the average is equal to 80. Accordingly, one can see that by retaining only the most recent value of the running average, the next value may be calculated.

Returning now to FIG. 3, in the event that Current Timeout (CTO) is not less than the Average Failed Timeout (Avg_FTO), as in step 365, step 375 is performed in which the Number of Same Failed (No_SF) is set equal to 1. Also at step 375, the value for the Last Failed Timeout (Last_FTO) is set equal to the value of the Current Timeout multiplied by 2 (CTO*2), which allows for a newly-discovered greater upper timeout limit. After performing steps 360, 370, and 375, the method proceeds to step 380.

In step 380, a determination is made as to whether the absolute value of the difference between the Current Timeout (CTO) and the Average Failed Timeout (Avg._FTO) is less than one half of the time increment used for the embodiment of FIG. 3 (such as 1 minute). In the event that indeed the absolute value of the difference between the Current Timeout (CTO) and the Average Failed Timeout (Avg._FTO) is less than one half of the time increment, step 385 is performed in which the Average Failed Timeout (Avg_FTO) is set equal to the value of the Current Timeout (CTO), and the method proceeds to step 390 (explained in greater detail hereinafter). In the event that the absolute value of the difference between the Current Timeout (CTO) and the Average Failed Timeout (Avg_FTO) is not less than one half of the time increment, step 390 is performed. In this step, the Number of Failed (No_Failed, which represents the number of times a particular value for Current Timeout has resulted in receiving a timeout error from the network) is incremented by 1. Also in step 390, the value for the Last Failed Timeout (Last_FTO) is set equal to the Current Timeout (CTO). The method then proceeds to step 400.

In step 400, a determination is made as to whether the Current Timeout (CTO) is greater than the time increment used in the method (1 minute for example of FIG. 3). In the event that the Current Timeout (CTO) is indeed greater than the time increment used in the method, step 410 is executed in which the value for the Current Timeout (CTO) is decremented by the increment value (which for the embodiment of FIG. 3 implies that value for the Current Timeout is reduced by 1 minute). After performing steps 400 and 410, the method proceeds to step 305 is performed in which the method returns to the beginning.

Figure 4:
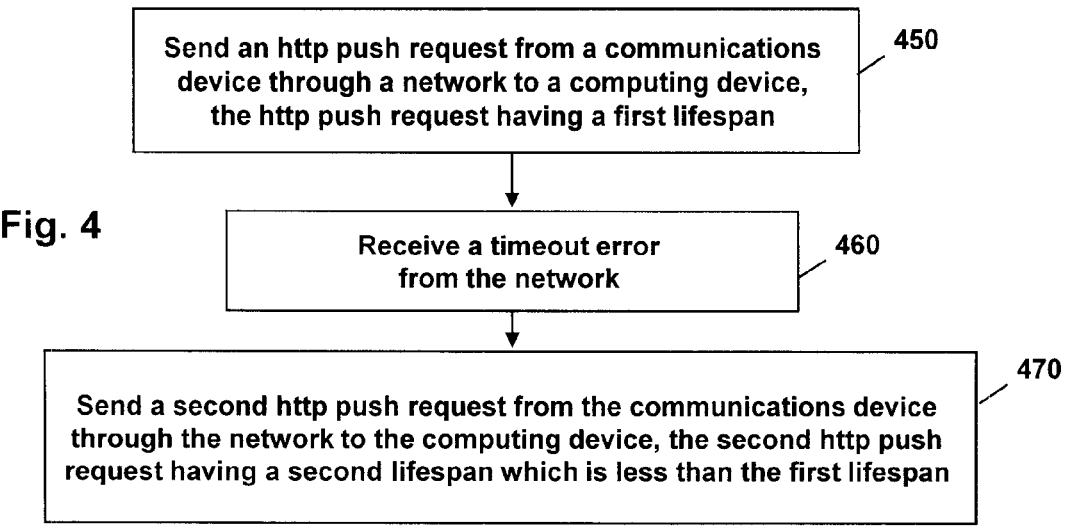
FIG. 4 is a flowchart for a method of operating a communications device in a network in accordance with another embodiment of the invention.

FIG. 4 is a flowchart for a method of operating a communications device in a network in accordance with another embodiment of the invention. Although the communications device of FIGS. 1 and 2 may be used to perform the method of FIG. 4, nothing prevents the use of alternative devices or systems having similar capability. The method begins at step 450, which includes sending an http push request of a first lifespan from a communications device through a network to a computing device. The method continues at step 460, which includes receiving a timeout error from the network. The method concludes at step 470, which includes sending a second http push request from the communications device through the network to the computing device, wherein the second http push request has a second lifespan which is less than the first lifespan.

Figure 5:
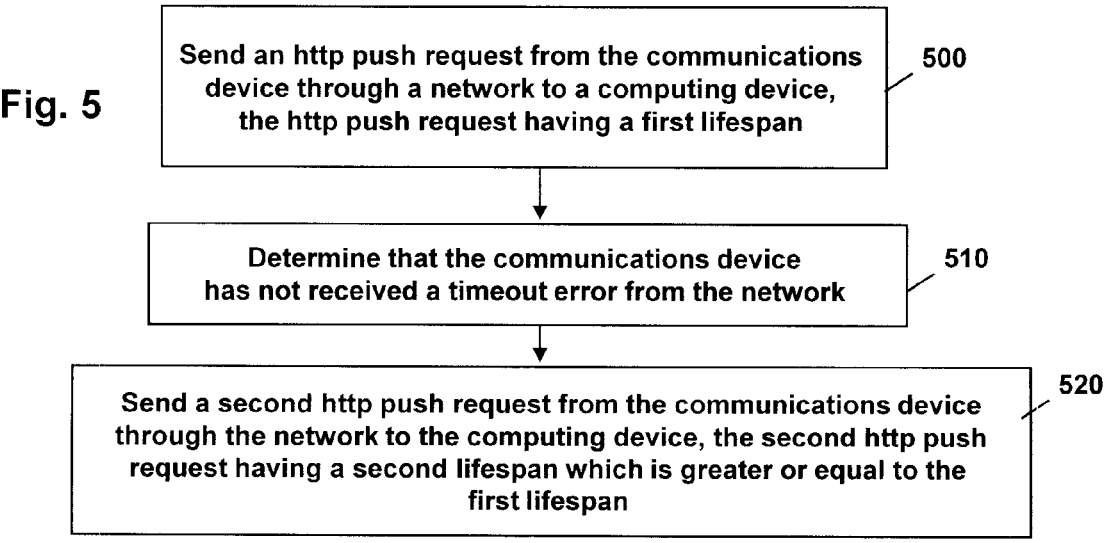
FIG. 5 is a flowchart for a method of operating a communications device in a network in accordance with another embodiment of the invention.

FIG. 5 is a flowchart for a method of operating a communications device in a network in accordance with another embodiment of the invention. The method of FIG. 5 covers the condition when a notification has not been received by the communications device. Although the communications device of FIGS. 1 and 2 may be used to perform the method of FIG. 4, nothing prevents the use of alternative devices or systems having similar capability. The method of FIG. 5 begins at step 500, which includes sending an http push request from a communications device through a network to a computing device, wherein the http push request has a first lifespan. The method continues at step 510, which includes determining that the communications device has not received a timeout error from the network. The method concludes at step 520, which includes sending a second http push request from the communications device through the network to the computing device, the second http push request having a second lifespan of which is greater than the first lifespan.

It should be noted that the inventors of the claimed invention initially considered alternative approaches other than embodiments of the invention. In one instance, the inventors considered maintaining an open TCP/IP connection as communications device 10 moves among the various networks, such as network 20. However, the inventors determined that to keep the connection open, battery 160 of FIG. 2 would require frequent recharging due to the increased message traffic required for the TCP/IP connection to remain open. Additionally, establishing a fixed TCP/IP connection with notification server 30 over the Internet may expose both the client and server to Internet security attacks. Finally, since the IP address does not remain static as the user moves among different cellular networks, the new IP address must be constantly tracked.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of notifying a communications device in a network, comprising:

sending an http push request from a communications device through a network to a computing device, the http push request having a first lifespan;

receiving a timeout error from the network; and sending a second http push request from the communications device through the network to the computing device, the second http push request having a second lifespan which is less than the first lifespan, wherein, prior to the second sending step, a calculating step is performed in which the lifespan of the second http push request is calculated by way of a quick convergence algorithm, and wherein the calculating step includes multiplying the value of the Current Timeout (CTO) by the number of times the communications device has consecutively received a timeout error at a given value of the CTO.

2. The method of claim 1, further comprising setting an Average Failed Timeout (AVG_FTO) equal to the value of the CTO when an absolute value of a difference between the CTO and the Avg_FTO is less than one half of a time increment used to increment the CTO.

3. The method of claim 1, further comprising sending a third http push request through the network to the computing device, the third http push request having a third lifespan, the third lifespan being greater than the second lifespan.

4. The method of claim 3, further comprising sending a fourth http push request through the network to the computing device, the fourth http push request having a fourth lifespan, the fourth lifespan being greater than the third lifespan.

5. The method of claim 4, further comprising sending a plurality of additional http push requests through the network to the computing device, the plurality of additional http push requests having a lifespan substantially equal to the fourth lifespan.

6. The method of claim 5, further comprising sending one additional http push request through the network to the computing device, the one additional http push request having a lifespan greater than the plurality of additional http push requests.

7. A method of notifying a communications device in a network, comprising:

sending an http push request from the communications device through a network to a computing device, the http push request having a first lifespan;

determining that the communications device has not received a timeout error from the network; and sending a second http push request from the communications device through the network to the computing device, the second http push request having a second lifespan which is greater than the first lifespan, wherein, prior to the second sending step, a calculating step is performed in which the lifespan of the second http push request is calculated by way of a quick convergence algorithm, and wherein the calculating step includes multiplying the value of the Current Timeout (CTO) by the number of times the communications device has consecutively received a timeout error at a given value of the CTO.

8. The method of claim 7, further comprising sending a third http push request through the network to the computing device, the third http push request having a third lifespan which is greater than the second http push request, the third http push request being sent after the communications device determines that a timeout error has not been received from the network in response to sending the second http push request.

9. The method of claim 7, further comprising sending a third http push request through the network to the computing device, the third http push request having a third lifespan which is less than the lifespan of the second http push request, the third http push request being sent after the communications device determines that a timeout error has been received from the network.

10. The method of claim 7, further comprising setting an Average Failed Timeout (AVG_FTO) equal to the value of the CTO when an absolute value of a difference between the CTO and the Avg_FTO is less than one half of a time increment used to increment the CTO.

11. The method of claim 7, further comprising sending a plurality of http push requests through the network to the computing device, wherein each of the plurality of http push requests is sent after the communications device has determined that a previous one of the plurality of http push requests has not resulted in receiving a timeout error from the network.

12. A communications device including memory for storage of non-transitory computer readable instructions, comprising:
   a transmitter for sending a first http push request to a network;
   a receiver for receiving a response to the first http push request from the network: and
   a processor for incrementing the lifespan of a second http push request upon determining that the receiver has not received a timeout error from the network in response to sending the first http push request, wherein the processor calculates the lifespan of the second http push request by way of a quick convergence algorithm, and wherein the calculating step includes multiplying a value of the Current Timeout (CTO) by the number of times the communications device has consecutively received a timeout error at a given value of the CTO.

13. The communications device of claim 12, wherein the processor additionally decrements the lifespan of a third http push request upon determining that the second http push request resulted in the receiver receiving a timeout error from the network in response to sending the second http push request.

14. The communications device of claim 12, further comprising setting an Average Failed Timeout (AVG_FTO) equal to the value of the CTO when an absolute value of a difference between the CTO and the Avg FTO is less than one half of a time increment used to increment the CTO.

15. The communications device of claim 12, wherein the processor sends a plurality of http push requests of a substantially similar lifespan, wherein each one of the plurality of http push requests is sent upon determining that a timeout error has not been received from the network in response to the communications device sending a preceding one of the plurality of http push requests.

16. The communications device of claim 15, wherein the processor occasionally sends an additional http push request having an incremented lifespan in the event that at least a portion of the plurality of http push requests have not resulted in receiving a timeout error from the network.

* * * * *

UNITED STATES PATENT AND TRADEMARK OFFICE
CERTIFICATE OF CORRECTION

| | | |
|---|---|---|
| PATENT NO. | : 8,082,354 B2 | Page 1 of 1 |
| APPLICATION NO. | : 12/414826 | |
| DATED | : December 20, 2011 | |
| INVENTOR(S) | : Mark Emmerich et al. | |

It is certified that error appears in the above-identified patent and that said Letters Patent is hereby corrected as shown below:

In column 10, line 22, in Claim 14, delete "Avg FTO" and insert -- Avg_FTO --, therefor.

Signed and Sealed this
Twenty-third Day of October, 2012

David J. Kappos
*Director of the United States Patent and Trademark Office*